United States Patent [19]

Pietenpol

[11] 3,892,345

[45] July 1, 1975

[54] CARTRIDGE LATCH

[75] Inventor: Kermit W. Pietenpol, Minneapolis, Minn.

[73] Assignee: Telex Communications, Inc., Minneapolis, Minn.

[22] Filed: Dec. 26, 1973

[21] Appl. No.: 428,409

[52] U.S. Cl. .................. 226/89; 226/181; 242/197; 274/4 B; 274/11 B

[51] Int. Cl. .................................... B65h 17/20

[58] Field of Search ................. 226/181, 89, 90, 91; 242/197, 198, 199, 200, 55.19 A; 274/11 B, 11 C, 4 B, 4 C

[56] References Cited

UNITED STATES PATENTS 3,610,497 10/1971 Ban .................................. 226/89

3,684,296 8/1972 Ban .................................. 226/90 X

*Primary Examiner*—Lloyd L. King
*Assistant Examiner*—Gene A. Church
*Attorney, Agent, or Firm*—Warren A. Sturm

[57] ABSTRACT

A shock resistant latching system for magnetic tape transports of the class in which a tape cartridge includes a pinch roller over which tape is to be passed by engagement with a rotating capstan. The latch is comprised of a pivotal lever arm having one end adapted to engage a cartridge at one side. The other end of the lever is free to move under external influences. A spring means is disposed between the first end and a pivot and another side of the end of the cartridge opposite to that which engages the rotating capstan. The pivot is in substantial alignment with the rotational axes of the capstan and pinch roller.

18 Claims, 6 Drawing Figures

CARTRIDGE LATCH

BRIEF SUMMARY OF THE INVENTION

This invention is concerned with tape transports of the type which must be reliably operational under adverse conditions, such as airplane and vehicle crash recorders where it is desired to continuously record one or more functions or signals representative of functions of the aircraft during, preceding and subsequent to a violent maneuver, such as a crash. It may also be desirable in certain high quality applications to reduce undesirable transient variations in speed of a tape caused by variations in engagement of a tape cartridge with a rotating capstan utilized to drive the same.

Prior art devices, such as that shown in U.S. Pat. Nos. 3,009,024 and 3,610,497, provide forms of latching apparatus which similarly engage the end of a cartridge opposite from that which it is to be driven by a rotating capstan. However, they have failed to achieve the operational stability and resistance to shock which has been attained in devices incorporating the principles of the present invention.

My invention accomplishes its ends through the utilization of a lever that is pivotally disposed about a pair of pivots adjacent the rear end of a cartridge when it is in operative disposition in a tape transport. The lever includes a first end which directly engages the cartridge at one side and a second end that is adapted to rotate about the pivots under the influences of external forces. The lever is also in driving relationship with the other side of the back of the cartridge through a spring biasing means that may be comprised of a leaf spring that is attached to the lever at a point adjacent the first end in engagement with the other side of the back of the cartridge. The pivots are preferably in alignment with the axes of rotation of the rotating capstan and the pinch wheel in the cartridge disposed near the front thereof.

It is therefore an object of my invention to provide an improved latching apparatus that is resistant to shock and other external forces and which effectively reduces interruption, wow and flutter which may arise due to variations in roundness of a pinch roller or rotating capstan to thereby allow operation of a tape transport under adverse operating conditions or with components exhibiting irregularities and nonuniformities.

These and other objects of my invention will become apparent from a consideration of the appended specification, claims and drawings in which:

Figure 3:
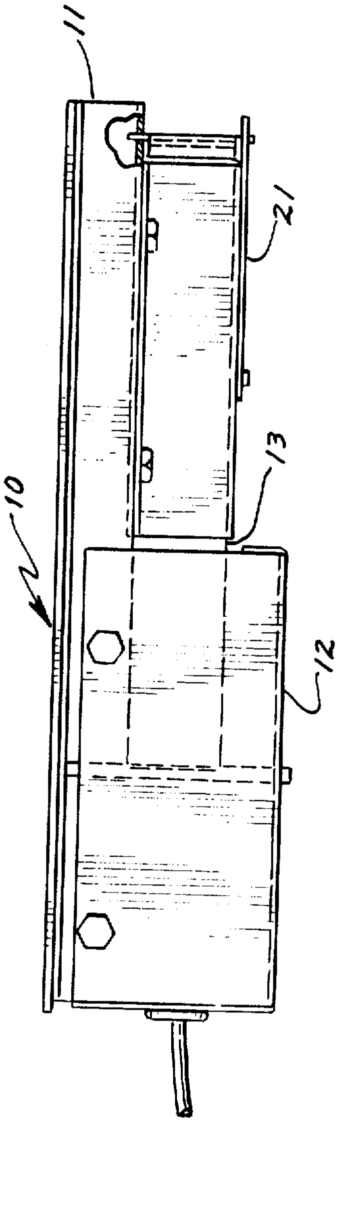
FIG. 3 is a side elevational view of the apparatus of FIG. 1.
Figure 2:
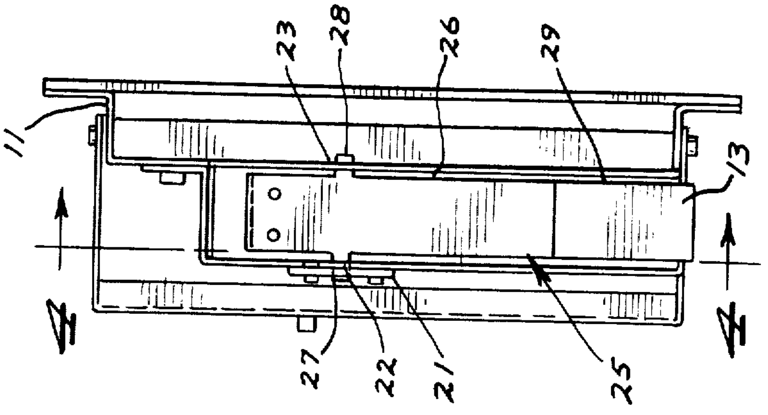
FIG. 2 is an end elevational view of the apparatus of FIG. 1.
Figure 1:
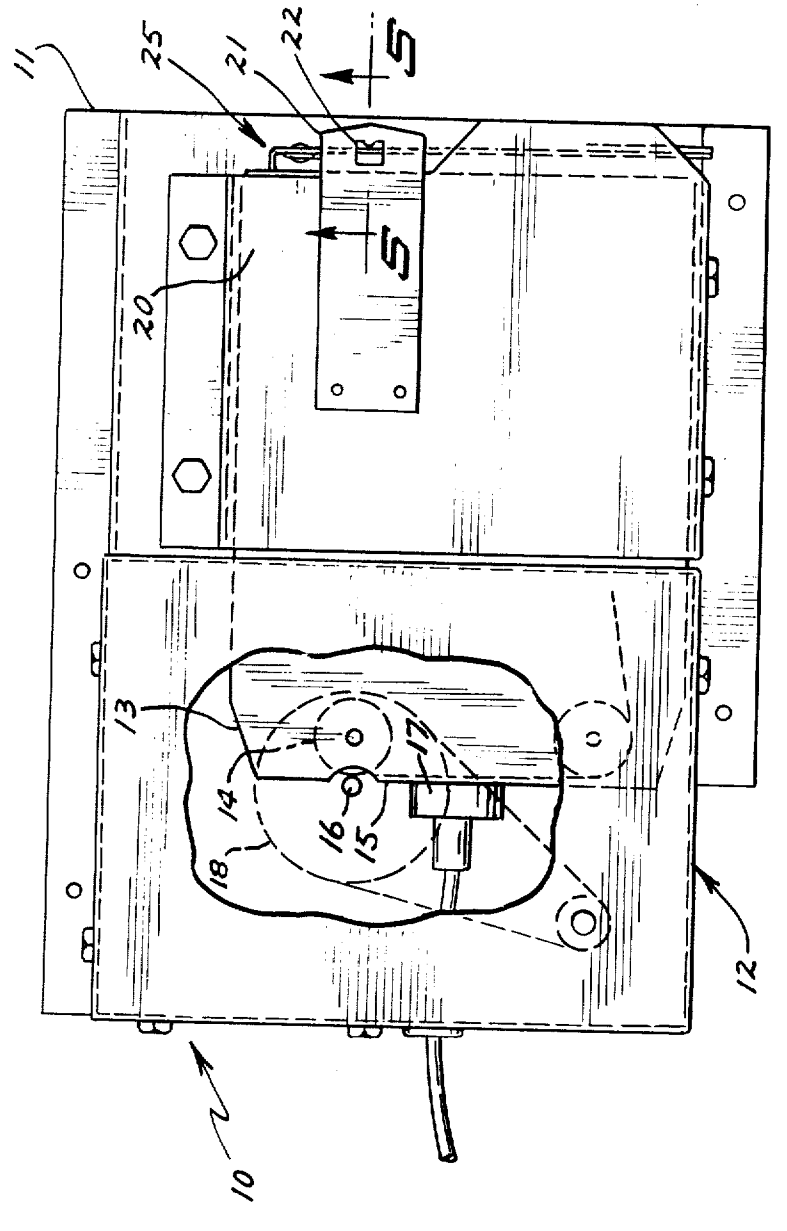
FIG. 1 is a top plan view of a tape transport embodying the principles of my invention with a portion broken away to further illustrate the interior thereof.
Figure 4:
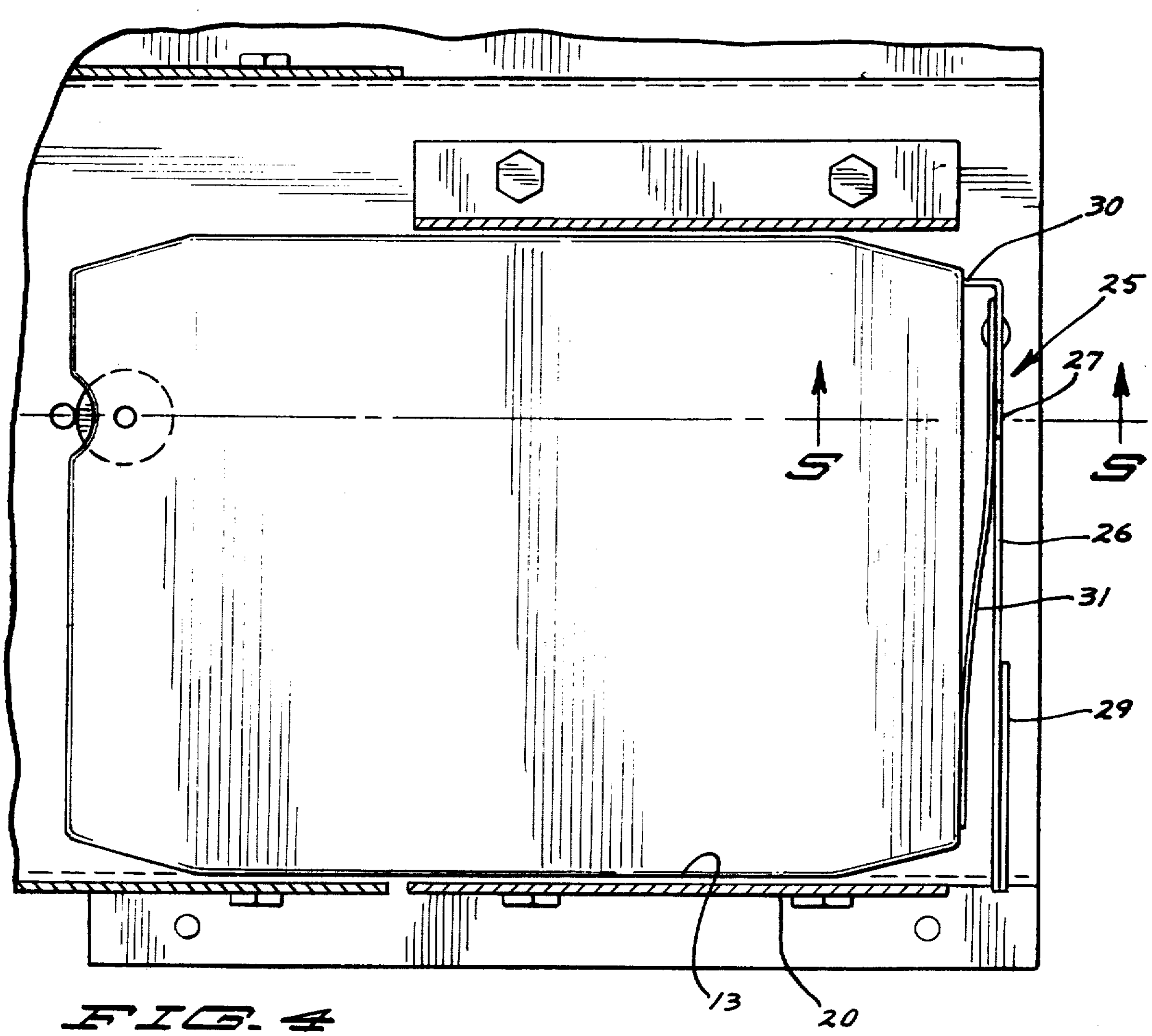
FIG. 4 is an enlarged fragmentary sectional view taken along section line 4—4 on FIG. 2 of the drawings illustrating the relationship of the various elements of my invention.
Figure 5:
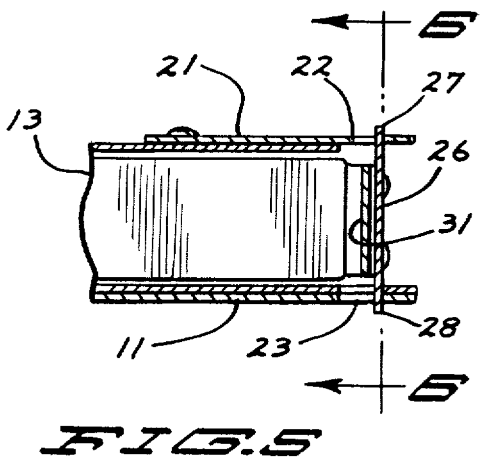
FIG. 5 is an enlarged fragmentary sectional view taken along section 5—5 on FIG. 4.
Figure 6:
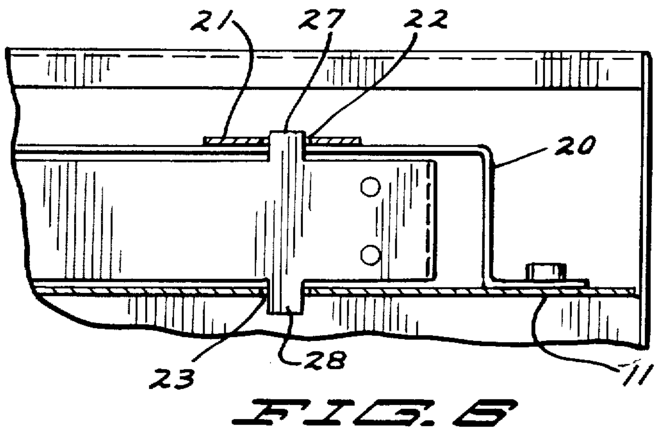
FIG. 6 is a further enlarged sectional view taken along section line 6—6 on FIG. 5 of the drawings.

Referring now to the drawings, an illustrative preferred embodiment of a tape transport is indicated generally by reference character 10 and is shown comprised of conventional components including a base 11, a cartridge receiving chamber 12 adapted to receive an 8-track cartridge 13, a capstan 16 that is adapted to be driven through suitable driving means from a motor and drive pulley assembly 18 and further includes a chamber 20 for receiving the body of a cartridge 13 and which includes a flexible rear extension member 21 that is provided with an aperture 22. One wall of chamber 20 is provided by base 11 which also includes a like aperture 23 in registration with aperture 22 on extention 21 so as to form a pair of pivots for receiving a latch to be described below.

Cartridge 13 is of conventional 8-track present-day cartridge construction and includes a pinch roller 14 that is adapted to drive a tape 15 when in frictional engagement with capstan 16.

A balanced latch, indicated generally by reference character 25, is shown having a lever arm 26 which includes a pair of laterally outwardly extending pivots 27 and 28, a weighted portion 29 at one end, and a contact portion, 30, at the other end in engagement with the back end of cartridge 13. Latch 25 also includes a spring contact 31 that is shown in the form of a spring biasing means comprised of suitable resilient material that is attached to lever 26 at its end in proximity to contact 30 and extends therefrom inwardly toward the other rear side of cartridge 13 and into operative engagement therewith.

Pivot apertures 22 and 23 are shown provided with fulcrum-like configurations for engaging the outwardly extending pivots 27 and 28 when the latch is in position.

As the effective force provided by latch 25 extends substantially through a line passing through the axes of rotation of capstan 16 and pinch roller 14, external forces that may be applied to the cartridge or tape transport are effectively balanced out and the force exerted upon cartridge 13 by the latch assembly remains substantially constant to the point that where irregularities in pinch roller 14 and/or capstan 16 are present, they may effectively be eliminated due to the uniformity in responsiveness of the latch 25 to compensate and maintain a uniform force so that fidelity of recording is maintained at a very high level.

In operation, the upper pivot arm is lifted to remove latch 25 and allow a cartridge to be changed.

Having now therefore fully illustrated and described my invention, what I claim to be new and desire to protect by Letters Patent is:

1. In tape handling apparatus of the class above described;

- a tape cartridge receiving chamber having inner and outer ends;
- a tape cartridge holding means including resilient lever means engaging the outer end of a cartridge in said chamber in at least two laterally spaced apart positions relative to a capstan in the inner end of said chamber; and
- means pivotally mounting said lever means intermediate the ends thereof.

2. The apparatus of claim 1 in which the pivot is substantially on an axis extending normal to the axes of revolution of a capstan and a pinch roller adjacent the inner end of the chamber.

3. The apparatus of claim 1 in which the lever includes a substantial mass at one end.

4. The apparatus of claim 3 in which one end of the lever is comprised of a resilient and a non-resilient portion.

5. The apparatus of claim 4 in which the non-resilient portion is of substantial mass.

6. The apparatus of claim 5 in which the pivotal mounting for the lever means is closer to one end than the other.

7. The apparatus of claim 3 in which the pivotal mounting for the lever means is closer to one end than the other.

8. The apparatus of claim 4 in which the pivotal mounting for the lever means is closer to one end than the other.

9. The apparatus of claim 1 in which the lever means is releasably disposed in the means pivotally mounting the lever means.

10. The apparatus of claim 2 in which the lever includes a substantial mass at one end.

11. In tape handling apparatus of the class above described;

a tape cartridge receiving chamber having inner and outer ends;

a tape cartridge holding means, including resilient lever means engaging the outer end of a cartridge in said chamber in at least two laterally spaced apart positions relative to an axis extending normal to the axes of revolution of a capstan and a pinch roller at the inner end of said chamber; and means pivotally mounting said lever means intermediate the ends thereof and the extremities of the outer end of said cartridge and chamber, whereby a cartridge is maintained in tape driving relationship with the capstan in the inner end of said chamber under severe abnormal operating conditions.

12. The apparatus of claim 11 in which the lever includes a substantial mass at one end.

13. The apparatus of claim 12 in which one end of the lever is comprised of a resilient and non-resilient portion.

14. The apparatus of claim 13 in which the non-resilient portion is of substantial mass.

15. The apparatus of claim 14 in which the pivotal mounting for the lever means is closer to one end than the other.

16. The apparatus of claim 12 in which the pivotal mounting for the lever means is closer to one end than the other.

17. The apparatus of claim 13 in which the pivotal mounting for the lever means is closer to one end than the other.

18. The apparatus of claim 11 in which the lever means is releasably disposed in the means pivotally mounting the lever means.

* * * * *